Figure 1:
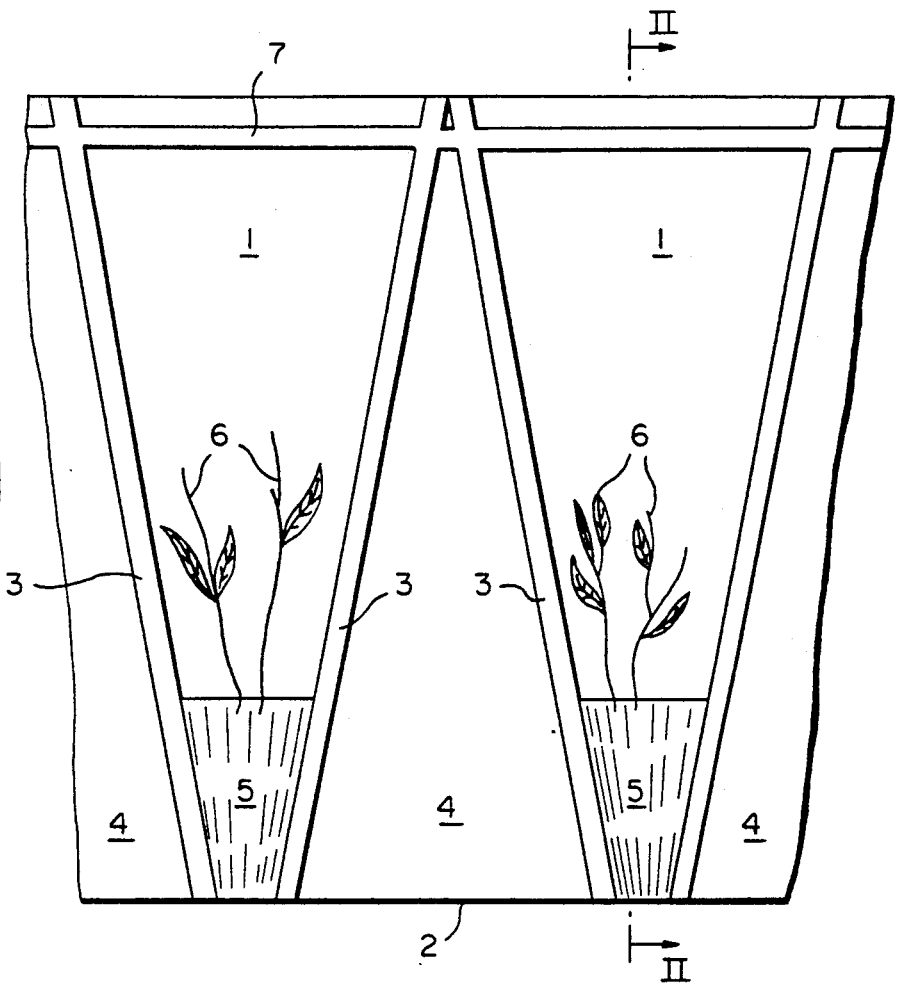

United States Patent [19]

Van Oeveren

[11] Patent Number: 5,155,932
[45] Date of Patent: Oct. 20, 1992

[54] METHOD FOR ASEPTICALLY ROOTING OF IN-VITRO PROPAGATED MATERIAL FOR THE HORTI- AND AGRICULTURE

[75] Inventor: Jacobus J. Van Oeveren, Malmedy, Belgium

[73] Assignee: PermX b.v., Wageningen, Netherlands

[21] Appl. No.: 659,294

[22] PCT Filed: Jun. 21, 1990

[86] PCT No.: PCT/NL90/00088
§ 371 Date: Apr. 22, 1991
§ 102(e) Date: Apr. 22, 1991

[87] PCT Pub. No.: WO90/15528
PCT Pub. Date: Dec. 27, 1990

[30] Foreign Application Priority Data
Jun. 21, 1989 [NL] Netherlands .......... 8901562

[51] Int. Cl.$^5$ .......... A01H 4/00; A01G 31/00
[52] U.S. Cl. .......... 47/1.01; 47/58
[58] Field of Search .......... 47/1.01, 58

[56] References Cited

U.S. PATENT DOCUMENTS 3,739,522 6/1973 Greenbaum .
3,973,355 8/1976 McKenzie .
4,034,508 7/1977 Dedolph .
4,189,868 2/1980 Tymchuck et al. .

FOREIGN PATENT DOCUMENTS 0252191 1/1988 European Pat. Off. .
WO88/06402 9/1988 PCT Int'l Appl. .

Primary Examiner—Richard E. Chilcot, Jr.
Assistant Examiner—Joanne C. Downs
Attorney, Agent, or Firm—Browdy and Neimark

[57] ABSTRACT

A method for aseptically rooting of in-vitro propagated material for the horti- and agriculture, using a rooting medium, within a closed integument formed of a semi-permeable and translucent membrane. According to the invention the plant to be rooted is put into a spongy artificial substrate which is impregnated or soaked with the rooting medium in liquid form and is enclosed within the integument.

7 Claims, 1 Drawing Sheet

METHOD FOR ASEPTICALLY ROOTING OF IN-VITRO PROPAGATED MATERIAL FOR THE HORTI- AND AGRICULTURE

The invention relates to a method for aseptically rooting of in-vitro propagated material for the horti- and agriculture, using a rooting medium, within a closed integument formed of a semi-permeable and transluscent membrane.

WO 88/06402 discloses the principle of (plant) tissue culturing by enclosing the tissue material to be propagated together with a suitable medium into an integument of a semi-permeable and translucent material, which allows light-transmission and gas-exchange but seals out the biological contaminance in the ambient environment.

It has also been known to root in-vitro (i.e. under aseptic conditions) propagated material in a rooting medium, that is usually composed of water, auxine hormones, micro- and macro salts, vitamins, saccharose and agar, the percentage of which components varying with the type of plant, whereas the agar functions therein as a gel-forming agent. More specifically the above document also teaches the growth of individual plantlets from plant tissue material propagated in the above manner, by enclosing a portion (cutting) of such propagated material, together with a suitable medium in gel form, into a similar integument.

This well-known rooting method typically results in the forming of roots consisting of a hollow tube having a closed end (root-tip). In general there is no question of root-hair forming, so that the single root-tip is of vital importance, because only this portion of the root is capable of absorbing nutriments. When transferring the rooted plant material to in-vivo circumstances, such root-tips may easily get damaged, thereby causing a delay of the initial growth or even a complete dying back of the plantlet. Besides in-vivo root development has to take place before actual plant growth may start.

The present invention aims at improving the root system of an in-vitro propagated plant so as to accelerate the habituation of the plant to in-vivo circumstances and also to accelerate the initiation of the growing process.

According to the invention this aim is achieved in that the plant to be rooted is put into a spongy artificial substrate which is impregnated or soaked with the rooting medium in liquid form and is enclosed within the integument.

It has been found that in this manner the root-hair forming is considerably improved, due to which the plantlet obtained by in-vitro propagation will be more resistant to the transfer to (the first stage) of the in-vivo growing conditions, while more specifically the initial growth is substantially improved.

It is to be noted that it has been known per se to grow plants—under in-vivo conditions—on artificial substrates e.g. of rock wool. These cases, however, relate to the (further) growing of plants which have already obtained a root system. More specifically U.S. Pat. No. 4,189,868 teaches to position a plant with its root system within a supporting block of moisture absorbing material and to enclose the block-plant assembly within an integument. Also in this case the plant has already obtained its root system before positioning in the artificial substrate.

In principle a plurality of artificial substrate with plantlets to be rooted positioned therein could be enclosed within one integument.

Preferably, however, each artificial substrate with a plantlet to be rooted placed therein, is enclosed in a separate cellule formed of a semi-permeable membrane.

Placing the artificial substrates with the plantlets into individual cellules not only avoids affection of the individual plantlets by micro-organisms from the ambient environment, but also avoids the danger of mutual infection of the plantlets.

The semi-permeability of the membrane material allows the exchange of oxygen, carbon dioxide and vapour with the ambient atmosphere.

It has been found that the method of the invention permits the photo synthesis, which is characteristic for the natural in-vivo process, to be initiated in the in-vitro stage already. This also stimulates the forming of cuticle on the leaf. As a result of this the habituation of the rooted material to the natural, unprotected environment, is considerably accelerated due to the hardening starting, in fact, already during the rooting process.

Various forms are possible both for the integument and the artificial substrate. A small block or cylindrical body, in which occasionally more than one plantlet could be positioned if desired, is to be mentioned as a suitable form for such artificial substrate.

Specific advantages may be obtained, when use is made of a conically shaped artificial substrate, which is enclosed within a correspondingly conically shaped bottom portion of the cellule.

An artificial substrate so formed may be easily introduced into the cellule and will "wedge" itself in the correspondingly shaped bottom portion, with at least its circumferential wall becoming sealed onto that of the bottom portion of the cellule. This will cause the developing roots to remain within the artificial substrate.

The invention will be hereinafter further explained with reference to an example of a cellule to be used when carrying out the method.

Figure 2:
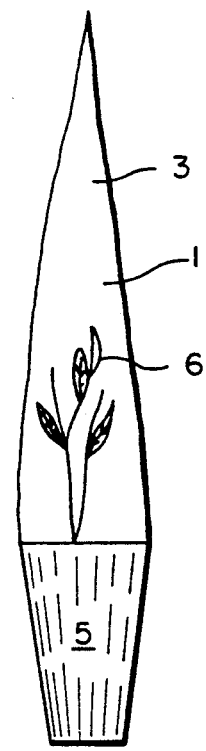

FIG. 1 shows a side view of a number of cellules each connected to a chain of such cellules and FIG. 2 is a cross-sectional view along the line II—II in FIG. 1.

The cellules designated at 1 in FIG. 1 are formed in a continuous web of plastic material, e.g. a polyethylene foil having a thickness of $25/\mu m$. The polyethylene foil may be laminated, the laminae being interconnected by cross-linking. The polymer laminae provide openings in the order of $0,01/\mu m$ which provide the desired semi-permeability.

The cellules are formed by folding the web along the ultimate bottom line 2 and then heat sealing it as indicated at 3. Adjacent pairs of sealing lines 3 extending mutually divergently from the bottom line 2 confine a plurality of upwardly widening compartments which constitute the proper cellules 1 and which are mutually separated by non-use web sections 4. The so formed cellules 1 are suitable for holding correspondingly shaped artificial substrates 5, e.g. formed of rock wool, which are to be impregnated or soaked with the rooting medium and in which the plantlets 6 to be rooted have to be positioned.

The composition of the rooting medium, with which the artificial substrates 5 are to be impregnated, may in principle comprise the same components as mentioned hereinabove, with the exception of the component agar, which is not used with the method of the present invention.

When carrying out the method the following procedure is preferred: a predetermined amount of liquid rooting medium is introduced through the still open upperside of the cellules 2. Thereupon the dry artificial substrates 2 with the plantlets to be rooted are inserted, after which the cellules may be closed as by heat sealing at 7.

It will be clear, that measures have to be taken to ensure that the actions just referred to will take place under the desired aseptic conditions.

I claim:

1. A method for aseptically rooting plant material comprising:
   adding in-vitro propagated plant material without roots to a integument formed of a semi-permeable and translucent membrane containing a spongy artificial substrate which, after roots of the plant have grown through it, is capable of being removed from the integument and transplanted without damaging root hairs, said substrate being impregnated or soaked with a rooting medium in liquid form,
   closing and sealing the integument, and
   culturing the plant material until roots form.

2. A method according to claim 1, further comprising a conically shaped artificial substrate, which is enclosed in a correspondingly conically shaped bottom portion of the integument.

3. A method according to claim 1 that at first an amount of the rooting medium is introduced and thereafter the artificial substrate(s) with the plantlets to be rooted is (are) inserted.

4. A method according to claim 1 wherein said rooting medium contains plant hormones.

5. A composition of matter comprising in-vitro propagated plant material without roots in contact with a spongy artificial substrate which, after roots of the plant have grown through it, is capable of being transplanted without damaging root hairs, said substrate being impregnated or soaked with a rooting medium, all enclosed within an integument formed of a semi-permeable and translucent membrane.

6. A composition according to claim 5 wherein said rooting medium contains plant hormones.

7. A composition according to claim 5 wherein both said substrate and the bottom portion of the integument are of conical shape.

* * * * *